United States Patent Office 3,162,621
Patented Dec. 22, 1964

3,162,621
PROCESS OF POLYMERIZING ALKENES EMPLOYING ORGANOMETALLIC CATALYSTS AND HYDROCARBON SOLVENTS
Eduard Enk, Gottfried Piekarski, and Ernst Wohlfarth, all of Burghausen, Bavaria, Germany, assignors to Wacker-Chemie G.m.b.H., Munich, Bavaria, Germany
No Drawing. Filed Sept. 20, 1960, Ser. No. 57,137
Claims priority, application Germany Sept. 24, 1961
4 Claims. (Cl. 260—82.5)

This invention relates to a method of polymerizing alkenes employing a novel catalyst system.

The art of polymerizing a wide variety of unsaturated organic compounds has gotten a great deal of attention in recent years. It has been disclosed that olefins can be polymerized under a wide range of pressures employing polymerization catalysts obtained on the one hand from organometallic compounds of aluminum, magnesium and zinc, and on the other hand from compounds of elements of groups IVB, VB and VIB of the periodic system of elements, under exclusion of air and moisture, in the presence of a solvent. An example of the known polymerization catalysts is prepared by bringing together an aluminum alkyl and titanium tetrachloride. Other catalyst systems for polymerizing olefins are also known.

It is the object of this invention to introduce a novel catalyst system for use in polymerizing alkenes. A novel method of polymerizing ethylene, propylene and other alkenes is an object of this invention. Another object is a method of copolymerizing alkenes and other vinylic compounds. Other objects and advantages of this invention are detailed in or will be apparent from this disclosure and appended claims.

This invention comprises the polymerization of alkenes, such as ethylene, and copolymerization of alkenes with other vinyl compounds employing (1) as polymerization catalysts organometallic complexes of metals of groups IA and IIA and metals of group IIB of the periodic system and (2) saturated aliphatic or saturated cycloaliphatic hydrocarbons, which may be substituted hydrocarbons, as solvents during preparation of the catalyst (1) and during the polymerization reaction.

It has been found that ethylene and its homologs cannot be satisfactorily polymerized with the catalysts (1) employed herein in the absence of the solvents (2). Furthermore, the use of aromatic solvents with the catalysts (1) defined herein results in little or no polymerization of ethylene and its homologs at atmospheric or even elevated pressures. However, when both the defined catalysts and the defined solvents are employed, the alkenes can be polymerized to high molecular weight, solid polymerizates or copolymerizates even at atmospheric pressure. The solid polymerizates obtained herein are extensively crystalline or sterically oriented.

The alkenes which can be polymerized or copolymerized according to this invention include ethylene, propylene, butene-1, 3-methyl-butene-1, 4-methyl-pentene-1, hexene-1, heptene-1, octene-1, and isobutylene. The alkenes can also be copolymerized with other vinyl compounds such as styrene, derivatives of styrene, vinyl chloride, acrylonitrile, methyl methacrylate, methylethylethylene, allene, pentadiene, cyclopentene, cyclopentadiene, phenylbutadiene, alkyl- and aryl-substituted or branched alkenes generally. Other substituted alkenes wherein halogen, oxygen (in the form of acids, anhydrides, alcohols, esters and ethers), nitrogen and metals such as Si, Ti, Zr, P, Ge, Sn and B can be employed as exemplified by allyl bromide, allyl iodide, tri- and tetra-chloroethylene, tetrafluoroethylene, chloroprene, dichlorostyrene, vinylacetate, vinyl butyl ether, acrylic acid ester, acrylic acid nitrile, methacrylic acid ester, methacrylic acid nitrile, methylvinyl carbinol, acrylic acid, methacrylic acid, vinylacetic acid, allyl stearate and so forth.

The organometallic catalysts employed herein are complex compounds of the general formula $[MM']R_n$ where M is an alkali metal or alkaline earth metal of groups IA and IIA of the periodic chart of the elements, M' is a metal of group IIB of the periodic chart and R is a monovalent hydrocarbon radical selected from alkyl, alkenyl, cycloalkyl, aryl, aralkyl and alkaryl radicals and $n$ is 3 or 4. The metals represented by M include Li, Na, K, Rb, Cs, Be, Mg, Ca, Sr, Ba and Ra, and the preferred compounds are those wherein M is Ca or Sr. The metals represented by M' are Zn, Cd and Hg and the preferred compounds are those wherein M' is Zn. Although a wide variety of organic radicals are represented by R, the preferred species are those wherein R is an alkyl radical such as methyl, ethyl, propyl, butyl, nonyl and octadecyl. Particularly useful catalysts are alkyl-lithium-zinc, alkyl-calcium-zinc, and alkyl-strontium-zinc complexes.

The solvents which are an integral part of the method of this invention are aliphatic or cyclic saturated hydrocarbons which may be substituted. Operable solvents include cyclopentane, n-pentane, 2-methylbutane, 2,2-dimethylpropane, methylcyclopropane, cyclohexane, hexane, 2-methylpentane, 3-methylpentane, 2,2-dimethylbutane, 2,3-dimethylbutane, methylcyclohexane, heptane, 2-methylhexane, 3-methylhexane, 2,3-dimethylpentane, 2,4-dimethylpentane, ethylcyclohexane, octane, 2,2,3-trimethylpentane, 2,2,4-trimethylpentane, nonane, 2,2,5-trimethylhexane, decalin and decane. Aliphatic alcohols such as methanol, ethanol, 1-propanol, 2-butanol, 2-methyl-1-propanol, 1-pentanol, 2-methyl-1-butanol, 3-methyl-2-butanol, cyclohexanol, 2-methylcyclohexanol, and 1-octanol, as well as esters, saturated aldehydes, aliphatic halogenated hydrocarbons such as chloroethane, chloropropane, 2-chloro-2-methylpropane, dichloromethane, 1,1-dichloroethane, pentachloroethane, bromoethane, 2-bromopropane, iodomethane and 1,1,2,2-tetrabromoethane and nitromethane, nitroethane, acetonitrile, n-propylamine, and so forth can be employed as solvents herein. Particularly useful herein are cyclohexane, ligroin and hydrated Fischer-Tropsch diesel oils.

The method of this invention comprises preparing the catalyst system in the inert solvent. This can be done by placing an organometallic compound of zinc, cadmium or mercury in the solvent and adding an alkali or alkali earth metal to the mixture. Thus zinc diethyl can be placed in a suitable solvent and metallic calcium added thereto to produce the desired calcium-zinc-ethyl complex. The alkene is then brought into contact with the catalyst in the solvent under pressure ranging from 0.9 to 200 atmospheres, preferably 5 to 30 atmospheres and at temperatures ranging from 10° to 200° C., preferably 20° to 100° C. The formation of the catalyst, dependent upon the purity of the reagents used, is generally terminated after 3–4 hours.

A particularly useful and novel embodiment of this invention comprises beginning the polymerization with a concentrated catalyst-solvent mass such that only a small proportion of solvent is present, and progressively diluting with solvent with or without additional catalyst as the polymerization reaction proceeds. Thus a useful catalyst-solvent mass for the start of the polymerization can be prepared by adding 0.1 mol zinc diethyl and the corresponding quantity of calcium to only 15 ml. of solvent.

After the polymerization reaction has run its course, the isolation and processing of the polymer products follow methods well known in the art.

A further innovation introduced according to this invention comprises the addition of organic silicon compounds, particularly organopolysiloxanes to the polymerization reaction mass. The presence of the organosilicon compound results in an increase in reaction rate and yield. It is especially useful to add the siloxane during preparation of the catalyst but the siloxane can be added to the catalyst-solvent mass after the catalyst is completely prepared.

The organosilicon compounds employed are generally (1) linear diorganosiloxane polymers, (2) cyclic diorganosiloxane polymers and/or (3) organosilicon compounds with incarcerated hetero atoms such as Al, Ge or Sn. The organic substituents in the organosilicon compounds are alkyl radicals such as methyl, propyl, butyl, ethyl, nonyl and octadecyl and aryl radicals such as phenyl, diphenyl and anthracyl.

The linear diorganosiloxanes (1) are polymers of $R'_2SiO$ units where $R'$ is alkyl or aryl with $YR'_2SiO$ terminal units where Y is —OH, —OR' or R'. These polymers are fluids soluble in organic solvents and range from water-thin fluids to gum-like masses. The cyclic diorganosiloxanes (2) have the general formula $(R'SiO)_m$ where $m$ is at least 3. The best known cyclic diorganosiloxanes are the trimer, tetramer, pentamer, hexamer, heptamer and octamer (i.e. $m=3$–$8$). However, higher values for $m$ are included within the scope of this case. The organosilicon compounds (3) with incarcerated atoms of Al, Ge or Sn include materials such as

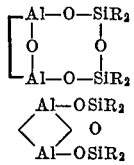

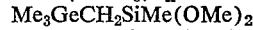
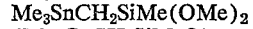
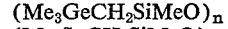
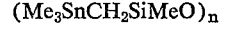

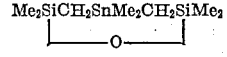

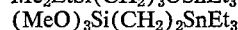
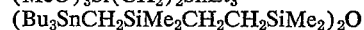
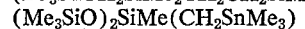
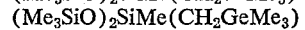
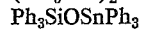

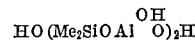

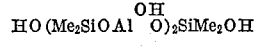

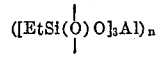

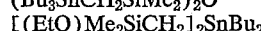

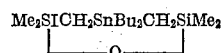

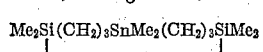

The organosilicon monomer or polymer can be added in any desired amount varying from at least as low as .1% to at least as high as 100% by weight calculated on the amount of organo-zinc, -cadmium or -mercury compound employed. Generally 1–20% of organosilicon material is advantageous and not impractically costly but optimum performance is usually obtained at 5% to 15% on the stated basis.

The following examples are included herein to aid those skilled in the art in understanding and practicing this invention. The invention is not limited by the examples and is fully delineated in the appended claims. All parts and percentages in the examples are based on weight and all viscosities were measured at 25° C. unless otherwise specified. In the entire disclosure the symbols Me, Et, Bu and Ph represent methyl, ethyl, butyl and phenyl radicals respectively.

Example 1

[A] A flask equipped with reflux condenser, stirring rod and gas inlet tube was carefully dried and swept free of air with dry nitrogen. The flask was charged with 0.1 mol zinc diethyl, .05 g. atoms of metallic calcium and 4 ml. hydrated, deaerated Fischer-Tropsch diesel oil (boiling range 190°–230° C.). The catalyst solution so prepared was further diluted with 20 ml. of the diesel oil and ethylene was bubbled into the mixture at 85° C. for 5 hours. During this time another 100 ml. of the diesel oil was added portionwise. Following standard procedures, the reaction mixture was next decomposed by adding 50 ml. dilute HCl at 30° C. followed by heating at 80° C. The solvent was driven off by steam distillation. A solid, white polymeric product was separated by filtration followed by washing and drying. The yield of polymer was 22 g. polyethylene having a melting point of 127°–130° C. as measured with a polarization microscope and having an ash content of less than 0.1%.

[B] The procedure outlined in [A] above was repeated employing thiophene-free, water-free, deaerated benzene in place of the diesel oil and no solid polymer product was obtained. A moderately distillable low polymer oil was the only detectable polymer obtained with the aromatic solvent.

[C] The procedure outlined in [A] above was repeated but the 125 ml. of diesel oil was added at the beginning before introducing any ethylene to the system. The solid polyethylene product was attained in much smaller yield amounting to 4.5 g. and having an ash content of 0.5%. Thus yield and polymer quality suffered when the entire amount of solvent was introduced at the outset of the polymerization.

Example 2

A catalyst suspension of 0.2 mol zinc diethyl and 0.1 g. atom calcium in 50 ml. Fischer-Tropsch diesel oil (as in Example 1) was charged with exclusion of moisture and air to a 1 liter autoclave fitted with stirrer, gas inlet and charging inlet. The autoclave was closed and ethylene introduced to 10 atmospheres of pressure maintained throughout the reaction by further addition of ethylene as required. The autoclave was heated to 80° C. for 5 hours and another 300 ml. of the diesel oil was added continuously during this period. The polymerization was stopped, the autoclave cooled and opened and after distillation a polyethlyene was obtained suspended in solvent. Processing as in Example 1 gave 50 g. of white polyethylene powder, melting point 130°–133° C., ash content .07%.

Example 3

The procedure of Example 2 was repeated except 5 ml. of water-free, devolatilized dimethylsiloxane polymeric oil of 50 cs. viscosity was added to the catalyst suspension before charging to the autoclave. A yield of 75 g. of high molecular weight polyethylene, melting point 129°–132° C., ash content 0.1% was obtained after only 3 hours reaction.

Example 4

[D] A catalyst suspension was prepared from 0.2 mol zinc diethyl, 0.1 g. atom calcium and 4.5 ml. phenylmethylsiloxane polymeric oil of 65 cs. viscosity in 10 ml. Fischer-Tropsch diesel oil (as in Example 3). The catalyst suspension was further diluted with 40 ml. of the diesel oil and the suspension was charged to an autoclave and polyethylene was introduced as in Example 3. After 4 hours of reaction at 80° C., a heavy polymer slurry had formed from which 67.2 g. white, powdered polyethylene was obtained having a melting point of 130°–132° C. and an ash content of less than 0.1%.

[E] The procedure [D] was repeated except dry, devolatilized cyclohexane was used as solvent in place of the diesel oil during preparation of the catalyst and during the polymerization. A yield of 62.7 g. of white, powdered polyethylene of the quality obtained in procedure [D] was obtained after 5.5 hours of reaction.

Example 5

The procedure of Example 4[D] was repeated with the materials of Example 4[D] except 5 g. of

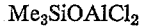

Me$_3$SiOAlCl$_2$ was substituted in place of the phenylmethylsiloxane oil. After 4 hours polymerization, a yield of 65.5 g. of polyethylene was obtained having a melting point of 127°–130° C. and ash content of .08%.

Example 6

A catalyst suspension was prepared from 0.1 mol zinc diethyl and .05 g. atoms strontium in the presence of 5 ml. linear dimethylsiloxane polymer of 50 cs. viscosity in 5 ml. ligroin boiling at 90°–100° C. After further dilution with 25 ml. of the ligroin, the catalyst suspension was charged to a 500 ml. autoclave and 100 g. of propylene was introduced into the autoclave. The mixture was heated at 65° C. and 12 atmospheres for 10 hours. During the reaction period an additional 200 ml. of the ligroin was added portionwise. After distillation and processing as in Example 1, there was obtained 45 g. of solid polypropylene, melting point 157°–162° C., insoluble in ether and n-heptane.

Example 7

Example 3 was repeated except an initial charge of 20 g. of propylene was introduced into the autoclave with the ethylene and the polymerization reaction was carried forward for 5 hours at 70° C. and 15 atmospheres. During polymerization, 80 g. of propylene and 300 ml. of the solvent were added continuously. After processing there was obtained 90.2 g. of a solid, amorphous copolymerizate soluble in heptane and having a softening temperature of 106° C. as measured by the Vikat method with a 1 kg. load.

Example 8

A catalyst suspension is prepared according to Example 1[A]. A mixture of 20 ml. of benzene as diluent and 11.6 g. freshly distilled acrylonitrile is added to the catalyst suspension and the mass is charged to a 500 ml. autoclave. Ethylene is introduced into the autoclave to 20 atmospheres and is kept at this pressure at 30° C. for four hours during which time 100 ml. of benzene is added in continuous fashion. The autoclave is cooled, opened and the contents processed as in Example 1 et seq. The polymeric product obtained is freed of insoluble polyethylene components after drying with dimethylformamide and the desired copolymer is precipitated from the solution with methyl alcohol. There was obtained a yield of 9 g. of amorphous, solid product composed of 61.4 mol percent acrylonitrile as measured by elementary analysis.

Example 9

The procedure of Example 8 was repeated except 15 g. of freshly distilled methylmethacrylate was employed in place of the acrylonitrile and polymerization was carried forward at 22° C. and 30 atmospheres pressure. A copolymeric product was obtained in yield of 12.2 g. of amorphous solid. Elementary analysis of the product disclosed it comprised 52.3 mol percent of methylmethacrylate.

That which is claimed is:

1. A method of polymerizing alkenes by contacting the alkene with a catalyst consisting essentially of an organometallic compound of the general formula [MM′]R$_n$ where M is an alkaline earth metal, M′ is zinc, each R is an alkyl radical, and $n$ is a positive integer greater than 2 and less than 5, in the presence of a solvent selected from the group consisting of saturated aliphatic hydrocarbons, and saturated cycloaliphatic hydrocarbons.
2. The method of claim 5 wherein M is Ca.
3. The method of claim 1 wherein M is Sr.
4. The method of claim 1 wherein the polymerization is carried forward in the presence of an organosilicon compound selected from the group consisting of linear diorganosiloxane polymers, cyclic diorganosiloxane polymers, and organosilicon compounds containing incarcerated hetero atoms selected from the group consisting of Al, Ge and Sn, the organic substituents in said organosilicon compound being selected from the group consisting of alkyl and aryl radicals.

References Cited in the file of this patent

UNITED STATES PATENTS

| | | |
|---|---|---|
| 2,904,542 | Fasce et al. | Sept. 15, 1959 |
| 2,951,860 | Plueddemann | Sept. 6, 1960 |

FOREIGN PATENTS

| | | |
|---|---|---|
| 821,107 | Great Britain | Sept. 30, 1959 |
| 1,179,637 | France | Dec. 22, 1958 |

UNITED STATES PATENT OFFICE
CERTIFICATE OF CORRECTION

Patent No. 3,162,621 December 22, 1964

Eduard Enk et al.

It is hereby certified that error appears in the above numbered patent requiring correction and that the said Letters Patent should read as corrected below.

Column 3, lines 66 to 68, the formula should appear as shown below instead of as in the patent:

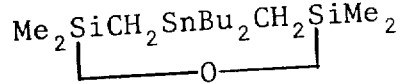

column 6, line 38, for the claim reference numeral "5" read -- 1 --.

Signed and sealed this 13th day of July 1965.

(SEAL)
Attest:

ERNEST W. SWIDER
Attesting Officer

EDWARD J. BRENNER
Commissioner of Patents